US009050736B2

(12) United States Patent
Nobile

(10) Patent No.: US 9,050,736 B2
(45) Date of Patent: Jun. 9, 2015

(54) OPERATOR FACE SHIELD FOR OUTDOOR POWER EQUIPMENT

(71) Applicant: Gaetano J. Nobile, Hobart, NY (US)

(72) Inventor: Gaetano J. Nobile, Hobart, NY (US)

( * ) Notice: Subject to any disclaimer, the term of this patent is extended or adjusted under 35 U.S.C. 154(b) by 234 days.

(21) Appl. No.: 13/734,079

(22) Filed: Jan. 4, 2013

(65) Prior Publication Data

US 2014/0076119 A1 Mar. 20, 2014

Related U.S. Application Data

(60) Provisional application No. 61/703,440, filed on Sep. 20, 2012.

(51) Int. Cl.

| | |
|---|---|
| ***A01D 75/20*** | (2006.01) |
| ***B26D 7/22*** | (2006.01) |
| ***B26B 29/00*** | (2006.01) |
| ***B27B 17/00*** | (2006.01) |
| ***B25F 5/02*** | (2006.01) |

(52) U.S. Cl.
CPC .. *B27B 17/00* (2013.01); *B25F 5/02* (2013.01)

(58) Field of Classification Search
CPC A01D 34/828; A01D 34/4167; A01D 75/206
USPC ........................................... 30/276, 286, 295
See application file for complete search history.

(56) References Cited

U.S. PATENT DOCUMENTS

| | | | | |
|---|---|---|---|---|
| 5,524,349 | A | 6/1996 | Dolin | |
| D373,712 | S | 9/1996 | Bridgers | |
| 6,226,876 | B1 | 5/2001 | Ezell | |
| 6,324,765 | B1 | 12/2001 | Watkins, Sr. | |
| 6,757,980 | B2 * | 7/2004 | Arsenault | 30/286 |
| 7,284,331 | B2 * | 10/2007 | Paddock | 30/276 |
| 7,624,737 | B2 * | 12/2009 | Klemm | 128/848 |
| 2004/0031157 | A1 | 2/2004 | Arsenault | |
| 2005/0183269 | A1 | 8/2005 | Thompson | |
| 2007/0089302 | A1 | 4/2007 | Paddock | |
| 2010/0186240 | A1 | 7/2010 | Waugh | |
| 2013/0326887 | A1 * | 12/2013 | Swan | 30/286 |

FOREIGN PATENT DOCUMENTS

| | | | |
|---|---|---|---|
| DE | 297 18 177 U1 | * | 1/1998 |
| DE | 198 18 555 A1 | * | 4/1999 |
| DE | 298 24 193 U1 | * | 8/2000 |

* cited by examiner

*Primary Examiner* — Hwei C Payer
(74) *Attorney, Agent, or Firm* — Karl F. Milde, Jr.; Eckert Seamans Cherin & Mellott, LLC

(57) ABSTRACT

A face shield for outdoor power equipment of the type having a power source, an operating element, and a substantially straight shaft extending between the power source and the operating element, includes a sheet of transparent material and a holding member attached to both the transparent sheet and the shaft. When so attached and held, the transparent sheet extends primarily upward from the shaft and is positioned closer than halfway between the operating element and the face of the equipment operator. The transparent sheet is of such dimensions and is maintained in such position by the holding member that it intersects all straight lines that extend between the operating element of the power equipment and the face of the equipment operator.

6 Claims, 9 Drawing Sheets

OPERATOR FACE SHIELD FOR OUTDOOR POWER EQUIPMENT

CROSS-REFERENCE TO RELATED APPLICATION

This application claims priority from the U.S. Provisional Application No. 61/703,440 filed Sep. 20, 2012.

BACKGROUND OF THE INVENTION

The present invention relates to an operator face shield for a certain type of hand-held outdoor power equipment, such as a lawn and weed trimmer or brushcutter, that has a substantially straight, elongate shaft or rod extending between a power source and a operating element.

The term "power source" as used herein is intended to mean and include a gasoline-powered engine, an electric motor or any other type of power source that can rotate a power shaft, drive a blower, drive a gear or chain or any other "operating element." The term "operating element" as used herein is intended to mean and include a device or implement that acts on the outdoor environment in some way, for example by cutting, rasping, trimming, blowing, digging or drilling.

When operating hand-held outdoor power equipment, such as lawn and weed trimmers, brushcutters, edgers, leaf blowers, pole pruners for tree branches, dirt augers, post hole diggers and the like, there is a danger that small solid objects become propelled by the operating element, become airborne in the operator's direction and, most dangerously, fly toward the operator's face. To protect the operator, and particularly the operator's face and eyes, protective apparel, such as headwear, neckwear, facemasks and/or goggles, are usually worn. However, the wearing of such apparel is quite inconvenient and, especially during the warm months of the year, also uncomfortable.

To reduce the danger of injury, various devices, shields and guards have been devised to block debris and other solid objects from flying in the direction of the operator. Such guards or shields are arranged in the vicinity of the operating element, sometimes partially surrounding the element, and forming a barrier between the element and the operator. Such devices are primarily intended for protecting the lower part of the operator's body and are not fully effective to protect the face, thus requiring the operator to wear the protective apparel to avoid the possibility of injury.

For example, the U.S. Patents Nos. D373 ,712; 5,524,349; 6,226,876 and 6,324,765 and U.S. Patent Publication Nos. 2004/0031157; 2005/0183269; 2007/0089302 and 2010/0186240 disclose guards or shields of various kinds for use with lawn and weed trimmers to protect the operator of the power equipment. However, all of these known guards or shields extend primarily downward from the elongate rod or shaft connecting the power source with the operating element, thereby protecting the feet and legs of the operator but not necessarily the face.

SUMMARY OF THE INVENTION

It is a general abject of the present invention to provide a face shield which is attachable to certain types of hand-held outdoor power equipment.

It is a principal object of the present invention to provide a face shield which is configured for, and attachable to, hand-held outdoor power equipment of the type comprising a power source, an operating element and a substantially straight, elongate shaft extending between the power source and the operating element. Equipment of this type includes a law trimmer and a brushcutter.

These objects, as well as further objects which will become apparent from the discussion that follows, are achieved, according to the present invention, by providing a face shield which comprises:

(a) a sheet of transparent material; and (b) a holding member, designed and configured to be attached to the shaft extending between the power source and the operating element, and attached to said transparent sheet such that, when so attached to the shaft, the transparent sheet extends primarily upward from the shaft.

According to one aspect of the invention, the transparent sheet is positioned closer than halfway between the operating element and the face of the equipment operator; and According to another aspect of the invention, the transparent sheet is of such dimensions, and is maintained in such position by the holding member, that it intersects all straight lines that extend between the operating element and the face of the equipment operator.

The transparent material used in the face shield is preferably clear plastic.

In the preferred embodiment, of the invention, the holding member used in the face shield includes a substantially triangular shaped base member with three sides, this base member being attachable to the elongate shaft along a first side. A holding post extends along and is attached to a second side of the base member for holding the transparent sheet. Preferably a separate sheet holder is affixed on one side to the holding post and affixed on the other to the transparent sheet.

Advantageously, the holding post is adjustable in position longitudinally with respect to the base member, thereby to adjust the vertical position of the transparent member with respect to the equipment operator.

Advantageously too, the transparent sheet is adjustable in position with respect to the sheet holder, thereby to adjust the horizontal position of transparent member with respect to the equipment operator.

For a full understanding of the present invention, reference should now be made to the following detailed description of the preferred embodiments of the invention as illustrated in the accompanying drawings.

BRIEF DESCRIPTION OF THE DRAWINGS

FIG. 1, comprising

FIG. 4, comprising

FIG. 5, comprising

FIG. 6, comprising

FIG. 7, comprising

DETAILED DESCRIPTION OF THE PREFERRED EMBODIMENT

Figure 1A:
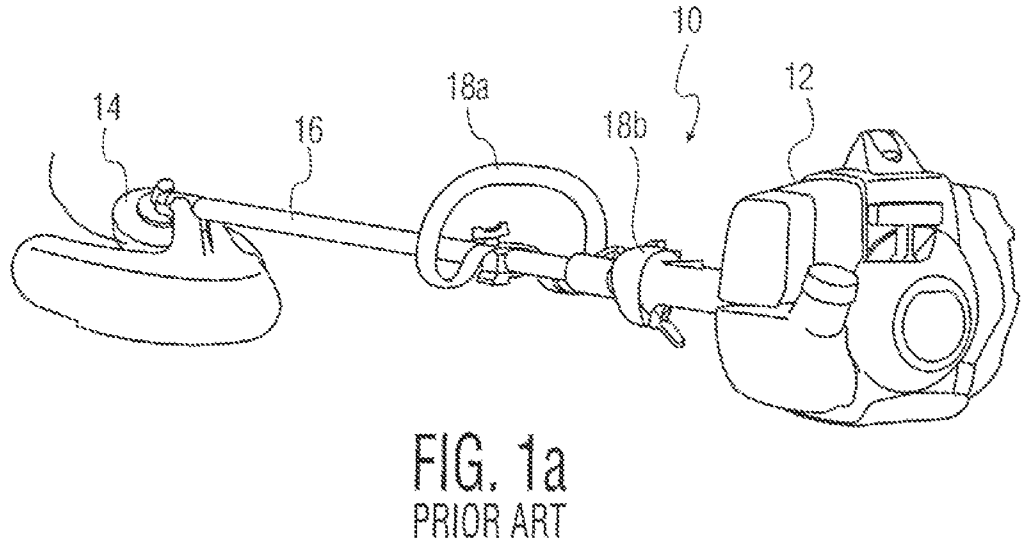
FIG. 1a PRIOR ART
FIGS. 1*a* and 1*b*, are perspective views of known hand-held outdoor power equipment of the type to which the present invention relates, namely a lawn trimmer and a brush cutter, respectively.

The preferred embodiments of the present invention will now be described with reference to FIGS. 1-7 of the drawings. Identical elements in the various figures are designated with the same reference numerals.

Figure 1B:
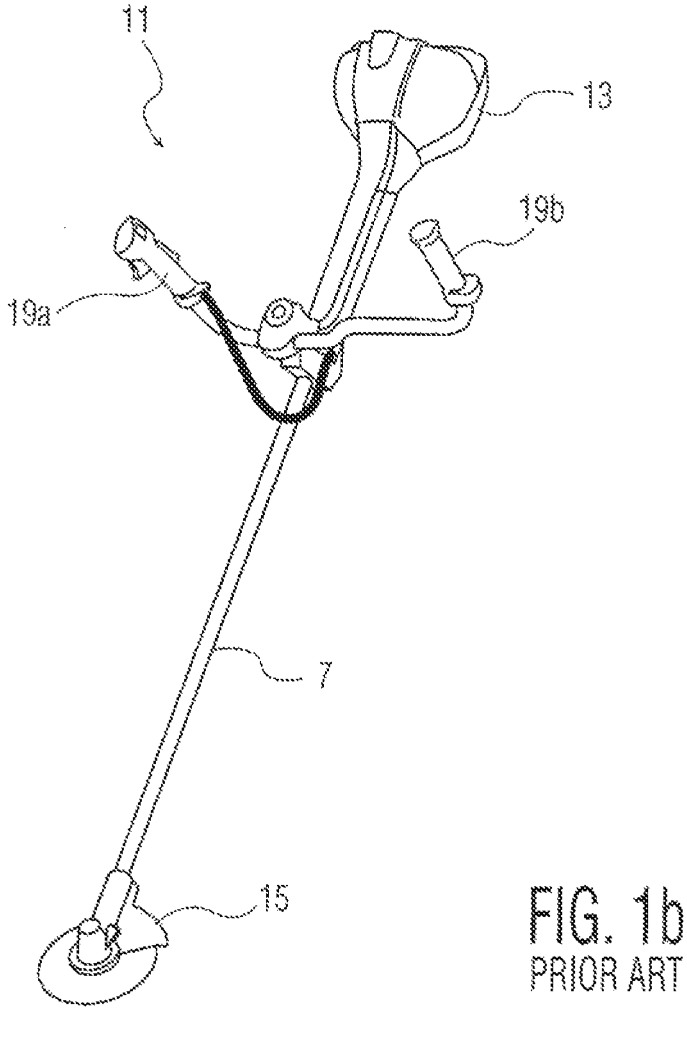
FIG. 1b PRIOR ART

FIGS. 1*a* and 1*b* show a typical lawn trimmer (weed wacker) 10 and brushcutter 11, respectively. This hand-held outdoor power equipment is very similar in design.

The lawn trimmer 10 comprises an engine 12 that drives a spinning trimmer 14 by means of a rotating rod (not shown) that extends through an elongate hollow shaft 16. In use, the lawn trimmer 10 is carried by a handle 18*a*, located at approximately the center of gravity of the equipment, and a hand grip 18*b* that includes an engine throttle control.

Similarly, the brushcutter 11 comprises an engine 13 and cutting disk 15 at opposite ends of a substantially straight elongate shaft 17. Handles 19*a* and 19*b* are provided tor steering and controlling the equipment.

Particularly in the case of a lawn trimmer, the shaft 16 between the engine 12 and the operating element 14 is sometimes curved near the and with the operating element. However, the main portion of the shaft is straight so that the shaft can be said to be "substantially straight".

Figure 2:
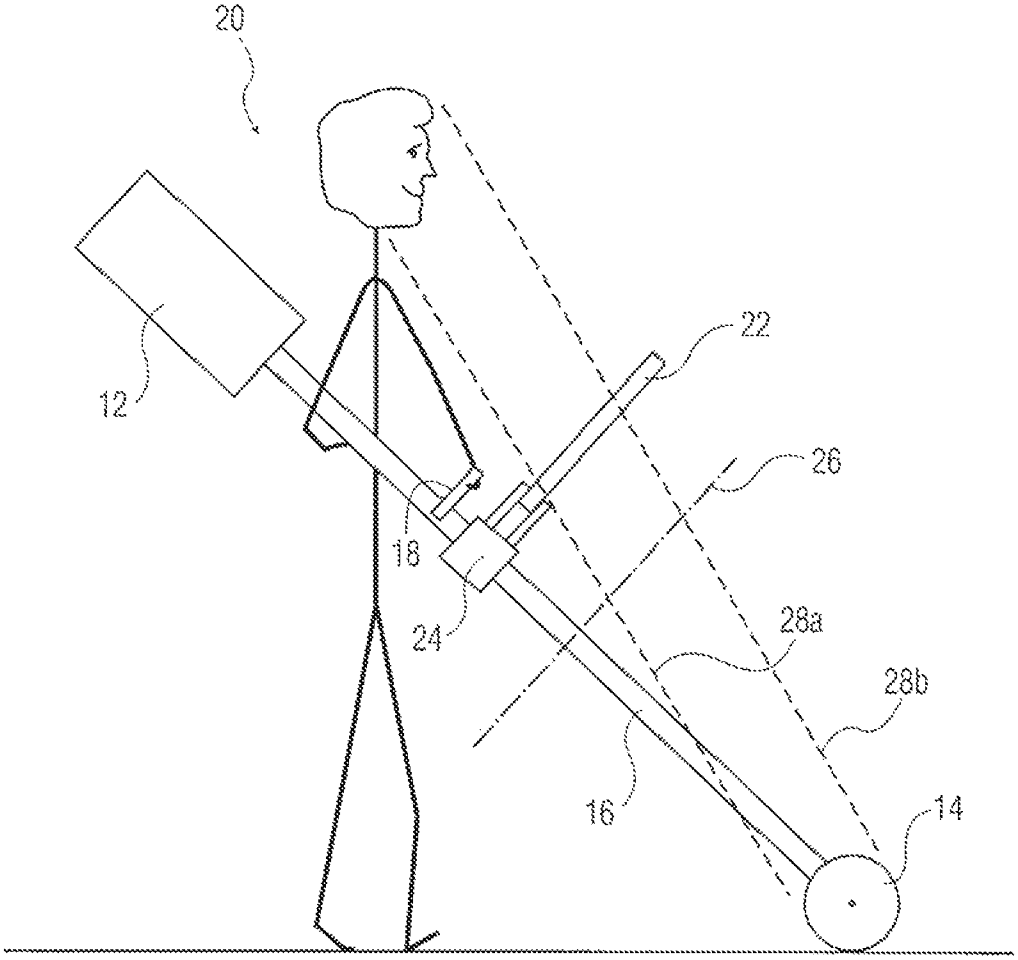
FIG. 2 is a representational diagram of outdoor power equipment of the type shown in FIG. 1, which is held by an operator and which includes a face shield according to the present invention.

FIG. 2 is a conceptual diagram illustrating the present invention in use on power equipment of the type shown in FIG. 1. FIG. 2 shows power equipment comprising an engine 12 and operating element 14 connected by a straight shaft 16. The operator 20 holds the equipment by its handle 18.

A face shield according to the present invention, comprising a transparent sheet 22 and a holding member 24 is attached to the shaft 16 at a point closer to the engine 12 than the midpoint of the shaft, demarcated in FIG. 2 by the dotted dashed line 26. As shown in this figure, the transparent sheet 22 is supported above the shaft 16 in a position that intersects ail straight lines 28*a* and 28*b* between the operating element 14 and the face of the operator 20. The operator can thus view the operating element 14 but any and all debris created by this element will foe intercepted from reaching the operator's face by the sheet 22.

Figure 3:
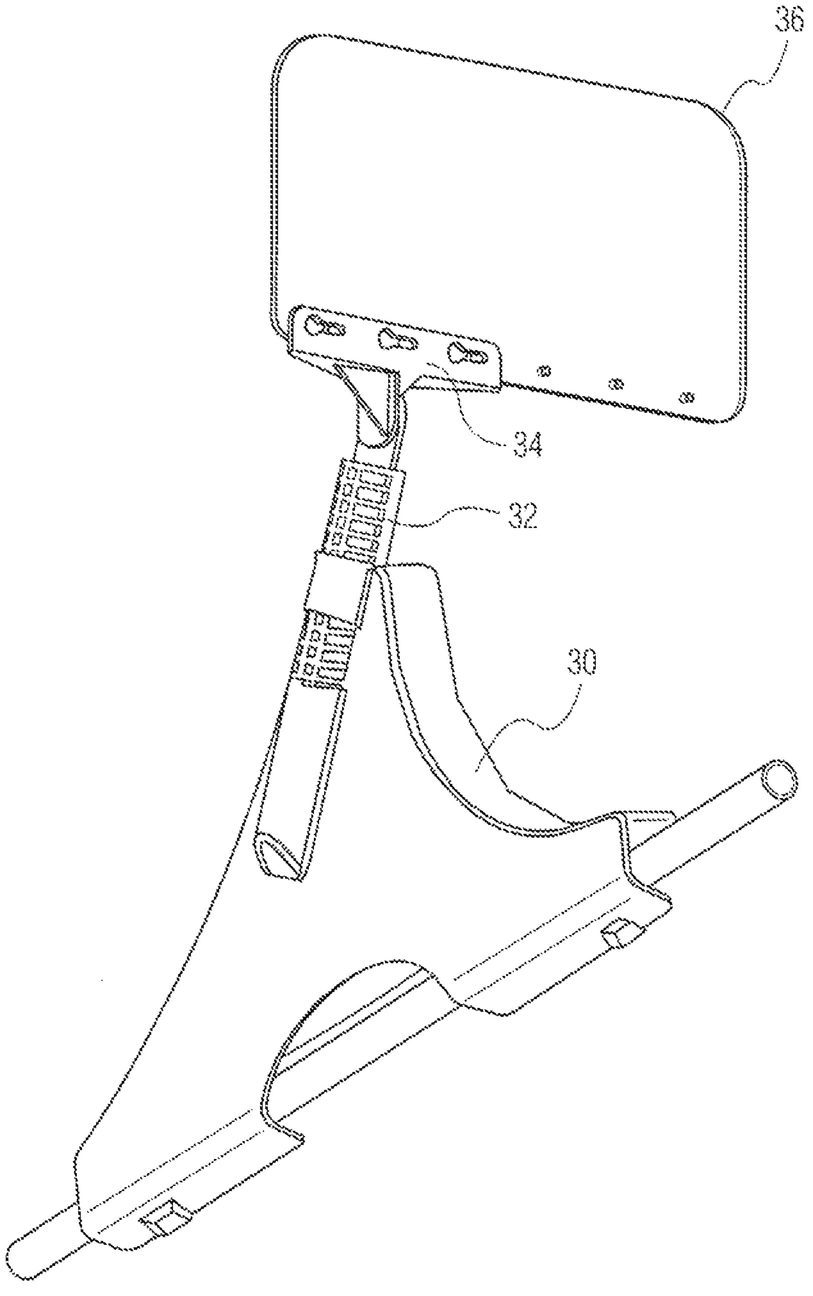
FIG. 3 is a perspective view of a face shield according to the preferred embodiment of the present invention.

The preferred embodiment of the present invention is illustrated in FIGS. 3-7. FIG. 3 shows the four main elements of the device in perspective view.

The face shield of this embodiment comprises a base member 30 of essentially triangular shape. A first side of the three sides of the triangle is configured for mounting on the shaft 16 at at least two spaced-apart points shown in FIG. 3. A holding post 32 is adjustably mounted to the base member 30 which extends away from the first side of the base member 30 and is attached to a region of a vertex between a second side and a third side of the base member 30 for holding the transparent sheet 36 upwardly. The position of this post member can be adjusted longitudinally to adjust its vertical position with respect to the shaft 16. A sheet holder 34 is affixed on one side thereof to the upper end of the holding post 32 and affixed on the other side thereof to the bottom of the transparent sheet 36. A series of equally spaced holes are provided in the sheet holder and on the bottom of the transparent sheet to permit horizontal adjustment of the transparent sheet.

Figure 4A:
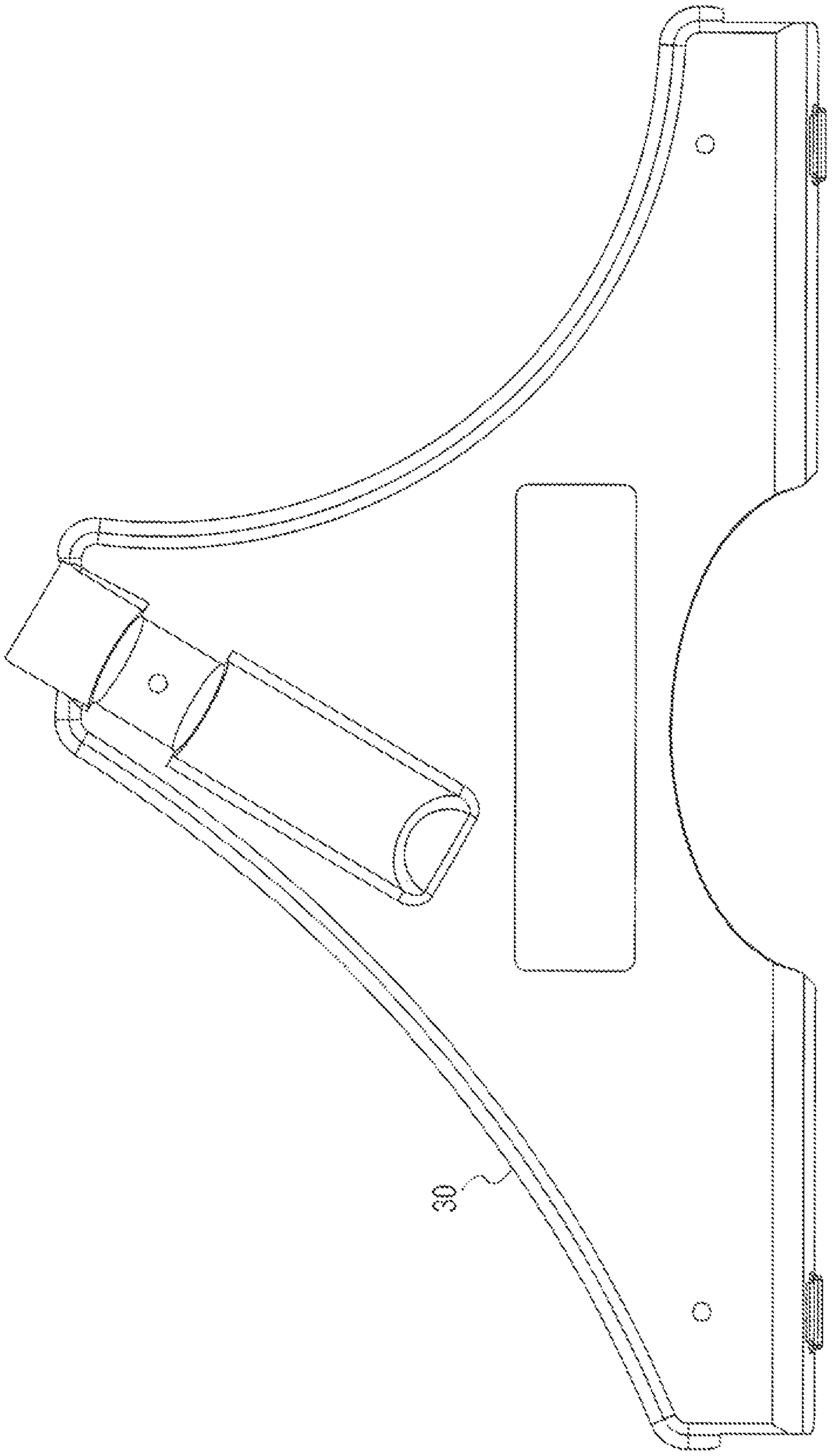
FIGS. 4*a* and 4*b*, are diagrammatic views of a base member used in the preferred embodiment shown in FIG. 3.
Figure 4B:
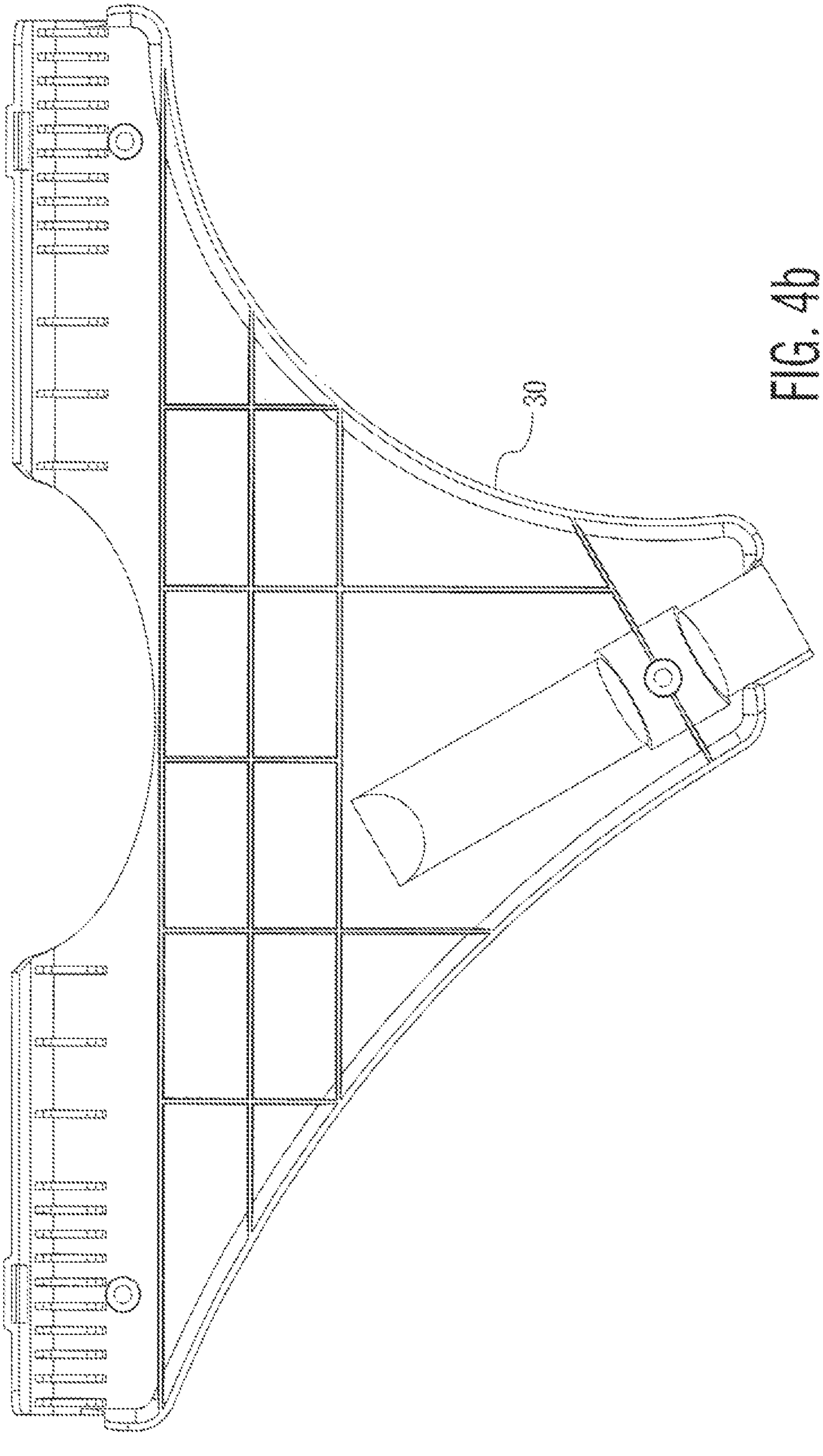
Figure 5A:
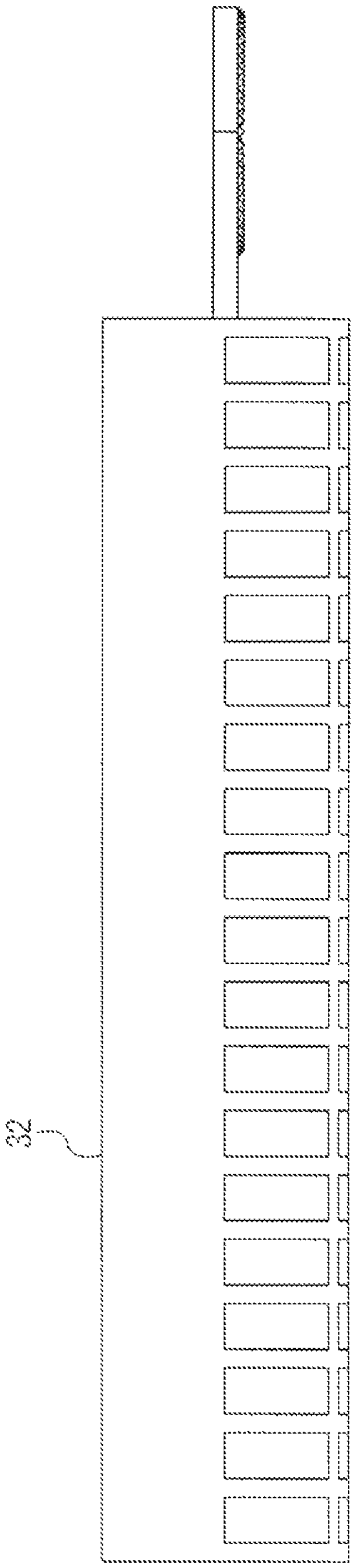
FIGS. 5*a* and 5*b*, are diagrammatic views of a holding post used in the preferred embodiment shown in FIG. 3.
Figure 5B:
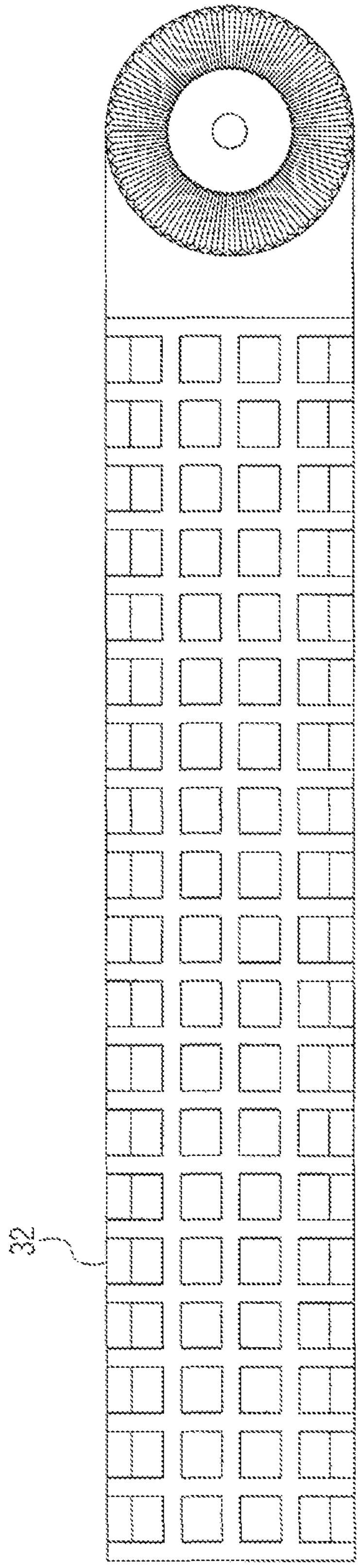
Figure 6A:
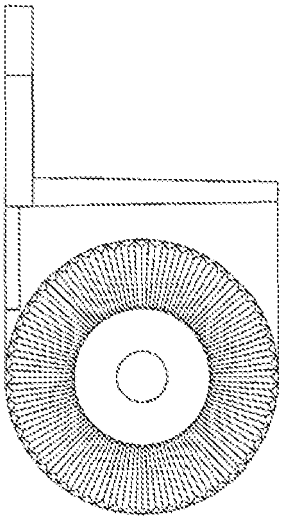
FIGS. 6*a*, 6*b* and 6*c*, are diagrammatic views of a sheet holder used in the preferred embodiment shown in FIG. 3
Figure 6B:
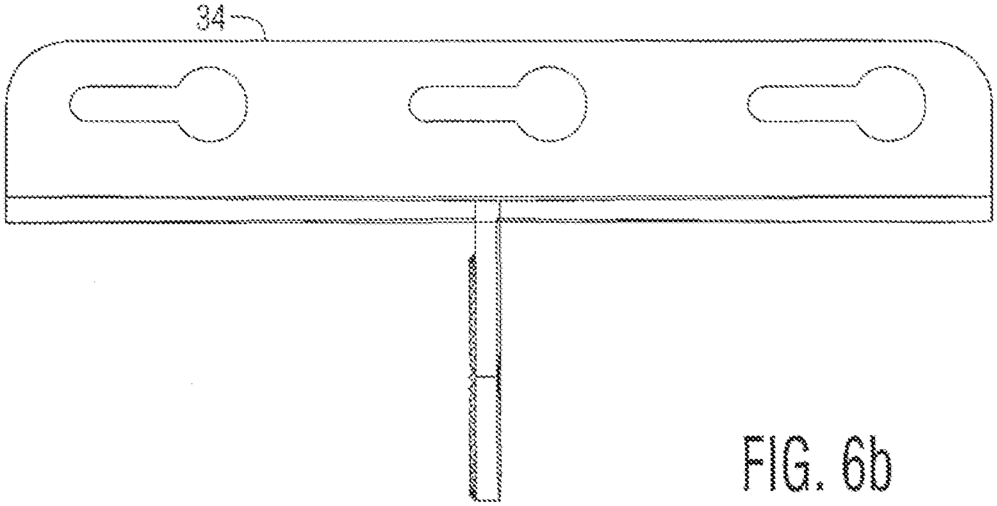
Figure 6C:
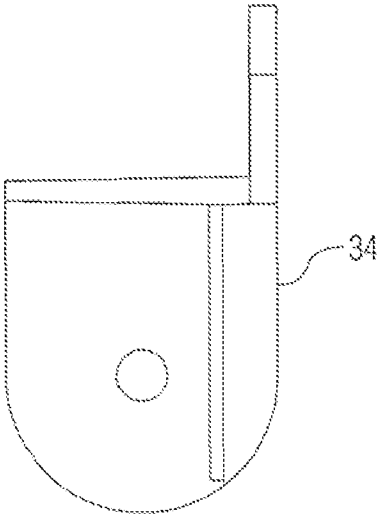
Figure 7A:
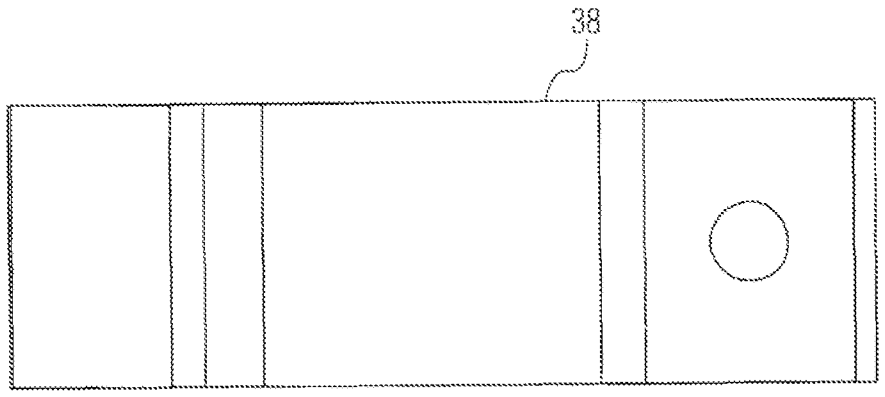
FIGS. 7*a* and 7*b*, are diagrammatic views of a clamp tap used in the preferred embodiment shown in FIG. 3.
Figure 7B:
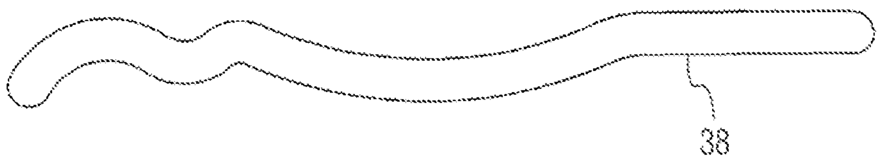

F*igs*. 4-7 are detailed drawings of the various parts of the face shield. FIGS. 4*a* and 4*b* show both sides of the base member 30 which is formed as a one-piece plastic casting. FIG. 5 shows the holding post 32, also of plastic, in side view. FIGS. 5*a* and 5*b* show two views of the post rotated 90° about its central axis with respect to each other. FIGS. 6*a*, 6*b* and 6*c* show the sheet holder 34 in each of three side views, respectively. FIGS. 7*a* and 7*b* show 38 for the sheet holder in face view and edge view, respectively.

There has thus been shown and described a novel operator face shield for outdoor power equipment which fulfills ail the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A face shield configured for attachment and use with a hand-held outdoor power equipment having a power source, an operating element, and a substantially straight, elongate shaft extending along longitudinal axis between the power source and the operating element, said face shield comprising:

(a) a transparent sheet;

(b) a holding member, configured to be attached to said shaft at at least two spaced-apart points along said axis thereof, and attached to said transparent sheet such that, when so attached to the shaft, the transparent sheet extends primarily upward from the shaft in a plane substantially perpendicular to said axis;

wherein the holding member includes a substantially trianquiar-shaped base member having three sides, said base member being attachable along a first side thereof to the elongate shaft at said two spaced-apart points;

wherein the holding member further includes an elongate holding post which extends away from the first side of the base member and is attached to a region of a vertex between a second side and a third side of the base member, for holding the transparent sheet upwardly; and wherein said transparent sheet is of such dimensions and is maintained in such position by said holding member that it intersects all straight lines that extend between the operating element of the power equipment and the face of the equipment operator, thereby to protect the equipment operator's face from flying debris caused by the operating element.

2. The face shield recited in claim 1, wherein the transparent material is clear plastic.

3. The face shield recited in claim 1, wherein the holding member further includes a sheet holder, affixed to the holding post and affixed to the transparent sheet.

4. The face shield recited in claim 3, wherein the holding post is adjustable in position longitudinally with respect to the base member, thereby to adjust the vertical position of the transparent sheet with respect to the equipment operator.

5. The face shield recited in claim 3, wherein the transparent sheet is adjustable in position with respect to the sheet holder, thereby to adjust the horizontal position of the transparent sheet with respect to the equipment operator.

6. The face shield recited in claim 1, wherein, when mounted on said shaft, said transparent sheet is positioned closer to the power source than midway between said operating element and the face of an operator of the power equipment.

* * * * *